United States Patent
Perkinson

(10) Patent No.: US 8,529,205 B2
(45) Date of Patent: Sep. 10, 2013

(54) PASSIVE CYCLIC PITCH CONTROL

(75) Inventor: Robert H. Perkinson, Somers, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 943 days.

(21) Appl. No.: 12/635,137

(22) Filed: Dec. 10, 2009

(65) Prior Publication Data

US 2011/0142646 A1 Jun. 16, 2011

(51) Int. Cl.
B64C 11/42 (2006.01)
(52) U.S. Cl.
USPC ............ 416/1; 416/102; 416/148; 416/157 R; 416/133; 416/140; 416/149; 416/153; 416/154
(58) Field of Classification Search
USPC .......... 416/1, 102, 148, 157 R, 157 A, 157 B, 416/164–167, 168 R, 168 A, 133, 149–150, 416/117–118, 140, 136, 138, 153–154, 156, 416/162

See application file for complete search history.

(56) References Cited

U.S. PATENT DOCUMENTS

| | | | |
|---|---|---|---|
| 2,422,558 A * | 6/1947 | Korff | 416/133 |
| 2,640,555 A | 6/1953 | Cushman | |
| 3,013,615 A * | 12/1961 | Pehrsson | 416/157 R |
| 4,037,986 A * | 7/1977 | Chilman | 416/157 R |
| 4,473,335 A * | 9/1984 | Henry | 416/148 |
| 4,591,313 A | 5/1986 | Miyatake et al. | |
| 5,431,539 A | 7/1995 | Carvalho | |
| 5,836,743 A | 11/1998 | Carvalho et al. | |
| 6,077,040 A | 6/2000 | Pruden et al. | |
| 6,511,292 B2 | 1/2003 | Perkinson et al. | |
| 6,514,044 B2 | 2/2003 | Talasco et al. | |
| 6,811,376 B2 | 11/2004 | Arel et al. | |
| 6,981,844 B2 | 1/2006 | Perkinson et al. | |
| 7,296,969 B2 | 11/2007 | Raes et al. | |

* cited by examiner

*Primary Examiner* — Christopher Verdier
(74) *Attorney, Agent, or Firm* — Cantor Colburn LLP

(57) ABSTRACT

A blade pitch control mechanism for a propeller assembly (10) includes an actuation shaft (24) having a spherical member (28) located at a propeller axis (22). A yoke (40) is located around the spherical member (28) and is rotatable thereon about a yoke tilt axis (62) substantially perpendicular to the propeller axis (22). The yoke (40) includes a plurality of propeller blade attachments (44), each receptive of a propeller blade (14). The plurality of blade attachments (44) are configured such that rotation of the yoke (40) about the yoke tilt axis (62) results in rotation of each propeller blade (14) about a blade pitch change axis (48).

17 Claims, 5 Drawing Sheets

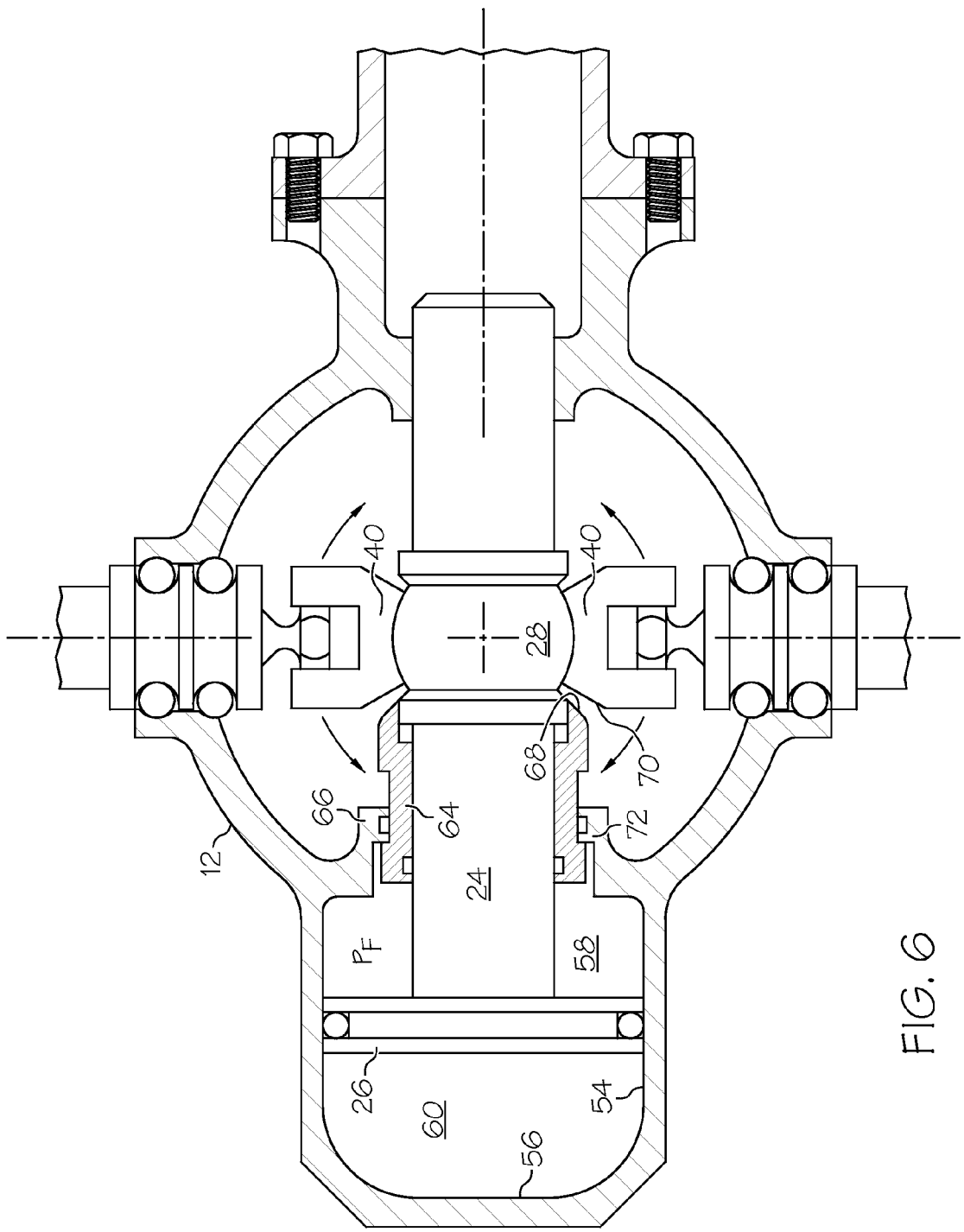

PASSIVE CYCLIC PITCH CONTROL

BACKGROUND OF THE INVENTION

The subject matter disclosed herein generally relates to propellers and propeller-driven aircraft. More specifically, the subject disclosure relates to propeller blade pitch control.

Propellers producing thrust or pressure in a non-uniform flow field are subject to sinusoidal variation of the thrust load on the propeller blades, known in the propeller science as a 1 P (once per revolution) load. This phenomenon occurs, for example, when the propeller is subjected to an angular inflow, an inflow that is non-parallel to the propeller shaft. Such angular inflow is common when an aircraft is in a yaw or G-producing maneuver such as a turn or a climb at takeoff The 1 P load manifests itself as a moment on the propeller shaft that lags the inflow angle by 90 degrees as a result of the advancing blade seeing a higher angle of attack and the receding blade seeing a lower angle of attack. This load must be reacted by the aircraft structure and is countered by various control surfaces on the aircraft, resulting in additional structural weight to react the load and larger control surfaces, and associated aircraft drag, to counter the moment. The art would well receive a way to reduce the 1 P load which would, in turn, result in an aircraft weight savings and reduction in reduction in control surface size necessary to counter the load.

BRIEF DESCRIPTION OF THE INVENTION

According to one aspect of the invention, a blade pitch control mechanism for a propeller assembly includes an actuation shaft having a spherical member located at a propeller axis. A yoke is located around the spherical member and is rotatable thereon about a yoke tilt axis substantially perpendicular to the propeller axis. The yoke includes a plurality of propeller blade attachments, each receptive of a propeller blade. The plurality of blade attachments are configured such that rotation of the yoke about the yoke tilt axis results in rotation of each propeller blade about a blade pitch change axis.

According to another aspect of the invention, a propeller assembly includes a propeller shaft extending along a propeller axis and a plurality of propeller blades in operable communication with the propeller shaft. The propeller assembly further includes a blade pitch control mechanism having an actuation shaft including a spherical member located at the propeller axis. A yoke is located around the spherical member and is rotatable thereon about a yoke tilt axis substantially perpendicular to the propeller axis. The yoke includes a plurality of blade attachments, each receptive of a propeller blade of the plurality of propeller blades. The plurality of blade attachments are configured such that rotation of the yoke on the spherical member about the yoke tilt axis results in rotation of each propeller blade about a blade pitch change axis.

According to yet another aspect of the invention, a method of cyclic pitch change of a plurality of propeller blades of a propeller assembly includes rotating a first propeller blade of the plurality of propeller blades about a blade pitch change axis in response to a flow force encountered by the first propeller blade. The rotation of the first propeller blade is translated into rotation of a yoke about a yoke tilt axis substantially perpendicular to a propeller axis of the propeller assembly. The second propeller blade, located substantially opposite the first propeller blade, is rotated about the blade pitch change axis in response to rotation of the yoke about the yoke tilt axis.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 6 is a cross-sectional view of another embodiment of a propeller assembly.

The detailed description explains embodiments of the invention, together with advantages and features, by way of example with reference to the drawings.

DETAILED DESCRIPTION OF THE INVENTION

Figure 1:
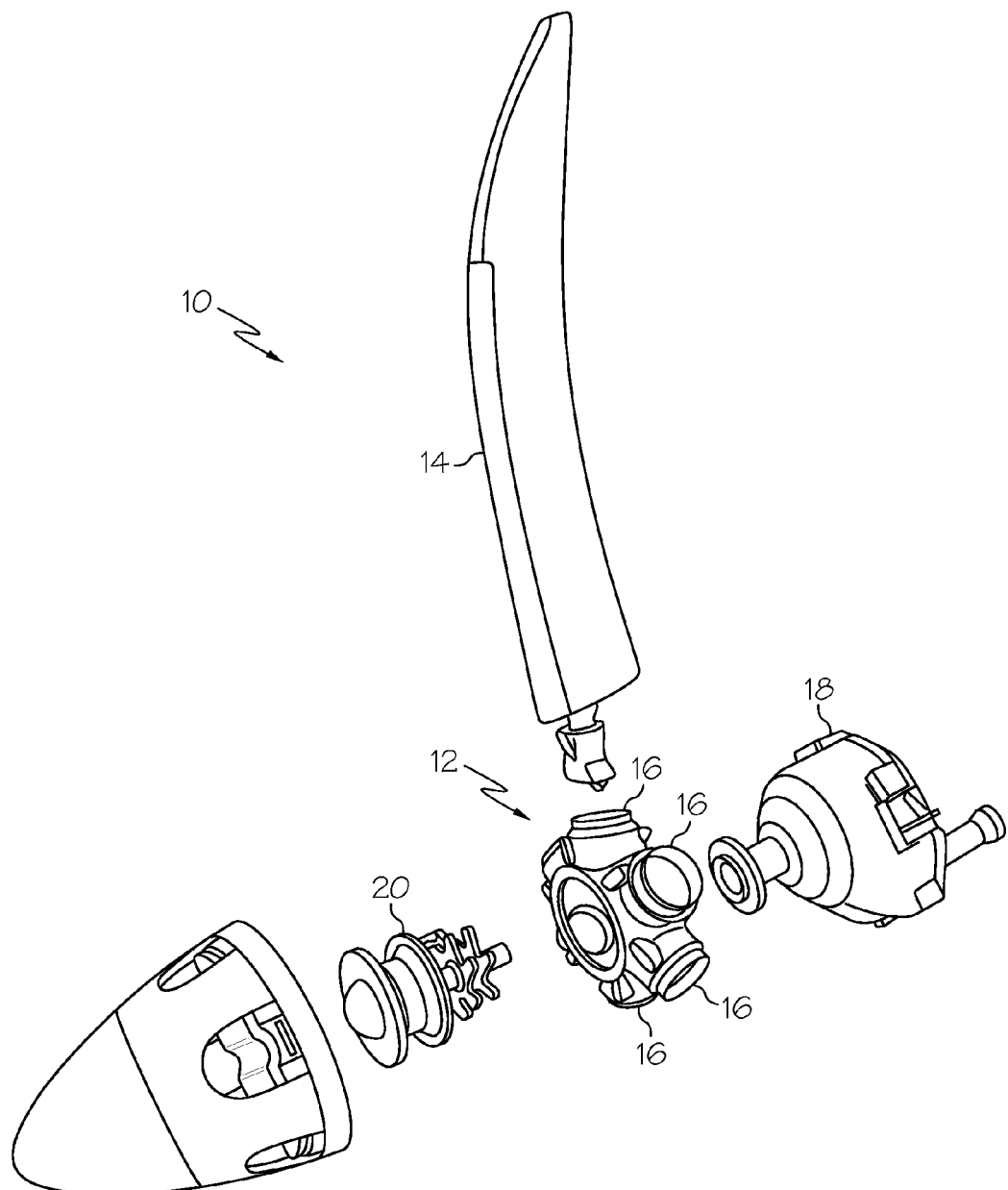
FIG. 1 is a partially-exploded view of an embodiment of a propeller assembly.

Referring to FIG. 1, shown is a partially exploded view of a propeller assembly 10. The propeller assembly 10 includes a hub 12 which is receptive of a plurality of propeller blades 14 through a plurality of hub openings 16. The propeller assembly 10 is driven by a propeller shaft 18. A pitch change actuator 20 is operably connected to the plurality of propeller blades 14 to change the pitch of the propeller blades 14 during operation of the propeller assembly 10.

Figure 2:
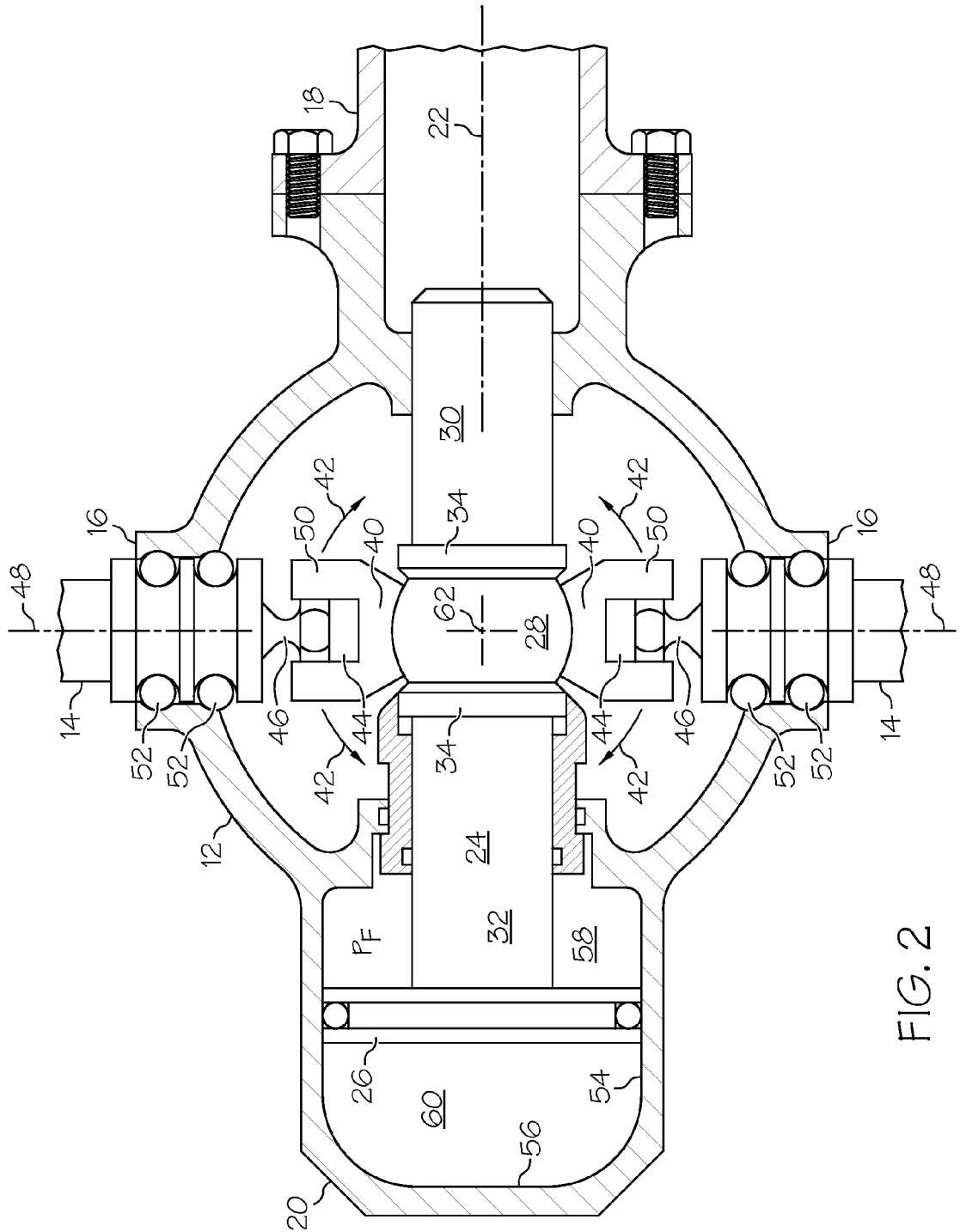
FIG. 2 is cross-sectional view of an embodiment of a propeller assembly.
Figure 3:
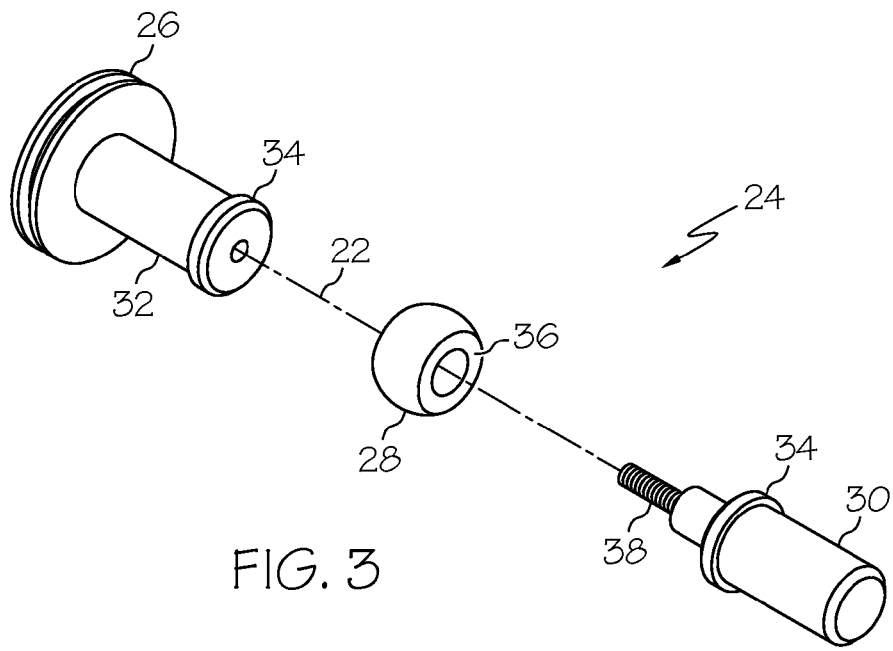
FIG. 3 is an exploded view of an embodiment of an actuation shaft of the propeller assembly of FIG. 2.

Referring now to FIG. 2, a cross-sectional view of an embodiment of the propeller assembly 10 is shown. The propeller shaft 18 is located at a propeller axis 22 which drives rotation of the propeller assembly 10 about the propeller axis 22. An actuation shaft 24 is located in the hub 12 along the propeller axis 22 and is fixedly attached to an actuation piston 26 at one end of the actuation shaft 24. The actuation shaft 24 includes a spherical section 28 located between a first portion 30 and second portion 32 of the actuation shaft 24 between adjacent stop surfaces 34. As shown in FIG. 3, in some embodiments, the spherical portion 28 includes a through hole 36 extending along the propeller axis 22. A pin 38 extends from the first portion 30 through the through hole 36 into the second portion 32 to secure the first portion 30, second portion 32 and spherical section 28 together forming the actuation shaft 24. Referring again to FIG. 2, the spherical section 28 may be formed from any suitable material, for example a hardened metal and/or wear resistant coating, or wear resistant composite material. At least one yoke 40 extends around the spherical section 28 and is supported thereon so as to permit articulation as indicated by arrows 42 within the confines of stop surfaces 34. The pitch change actuator piston 26 is slidably located in the pitch change actuator 20 such that linear motion of the piston 26 along the propeller axis 22 results in linear motion of the spherical section 28 and corresponding motion of the at least one yoke 40.

Figure 4:
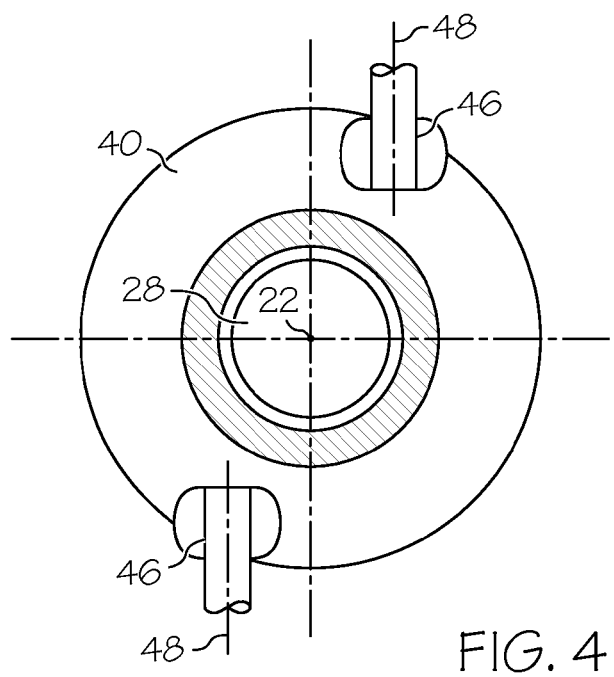
FIG. 4 is a partial cross-sectional view of an embodiment of a propeller assembly.

The plurality of propeller blades 14 are rotably located in the propeller hub 12 and confined in the yoke 40 at a yoke channel 44 formed in the yoke 40, via suitable pin and roller assemblies 46 connected to the plurality of propeller blades 14. As shown in FIG. 4, the pin and roller assemblies 46 are positioned offset in the yoke 40 such that translation of the yoke 40 along propeller axis 22 will result in rotation of blades 14 about a blade pitch change axis 48, and causes the plurality of rotor blades 14 to increase or decrease pitch in unison, this being well known in the art and commonly referred to as collective pitch change.

As a result of this invention, motion of the yoke 40 about the spherical section 28 will also result in rotation of the propeller blade 14 about its pitch change axis 48. Referring to FIG. 2, it can be seen that motion of yoke 40 about spherical section 28 causes pitch change of opposite blades 14 in opposite directions. In the embodiment shown in FIG. 2, two propeller blades 14 are shown, but propeller assemblies 10 having other quantities of propeller blades 14 are contemplated within the present scope. In the embodiment shown in FIG. 2, the yoke channel 44 is defined by two yoke bars 50 arranged in parallel, but other configurations which provide equivalent motion, for example a series of pins and links, may be utilized. Each propeller blade 14 extends outwardly from the hub 12 at the hub openings 16. Each propeller blade 14 is retained by one or more bearings 52 which allow for rotation of the propeller blade 14 about the pitch change axis 48, changing a pitch of the propeller blade 14.

Figure 5:
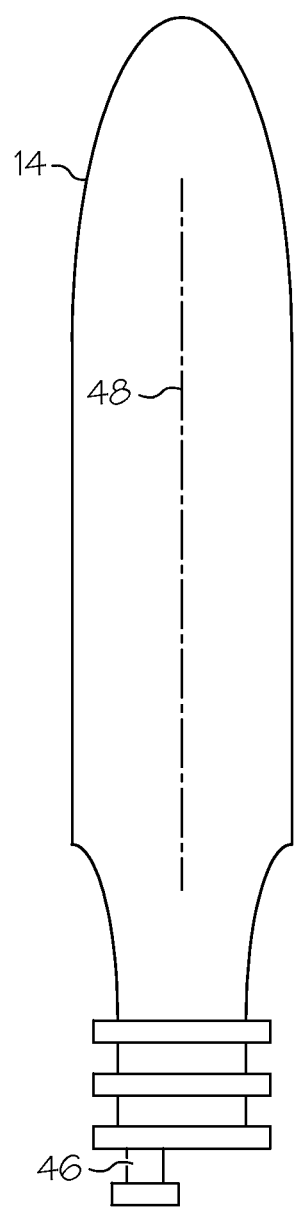
FIG. 5 is a view of an embodiment of a propeller blade.

Referring to FIG. 5, in some embodiments, each pin and roller assembly 46 is located off-center at the propeller blade 14 relative to the pitch change axis 48. Because of this off-center position, a force applied to the pin and roller assembly 46 via the yoke 40 results in rotation of the propeller blade 14 about the pitch change axis 48.

Referring again to FIG. 2, in baseline operation of the propeller assembly 10, pitch of the propeller blades 14 is changed via axial movement of the yoke 40 along the propeller axis 22. This axial movement is achieved by changing a pressure in a portion of a pressure chamber 54. For example, to move the yoke 40 axially toward a first end 56 of the hub 12, a pressure $P_f$ is increased in a shaft side 58 of the pressure chamber 54 to be greater than a pressure $P_c$ in an opposing side 60 of the pressure chamber 54. This results in an axial translation of the piston 26, and therefore the yoke 40, toward the first end 56. Since the pin and roller assembly 46/yoke 40 interface is offset, the axial movement of the yoke 40 along the propeller axis 22 results in a rotation of the propeller blades 14 about the pitch change axis 48, or a change in blade pitch. Alternatively, the pitch change can be reversed by increasing the pressure $P_c$ to be greater than $P_f$ to move the piston 26 away from the first end 56 thereby translating the yoke 40 away from the first end 56. In this embodiment, the movement of the yoke 40 and pressurization change in portions of the pressure chamber 54 are achieved via addition and removal of hydraulic fluid from the pressure chamber 54, by activation of a flight control by the pilot. It is to be appreciated, however, that other means of moving the yoke 40, mechanical and/or electrical, may be used.

Utilization of the spherical portion 28 increases the ability of the pitch of the propeller blades 14 to be adjusted as described earlier. Forces acting on the propeller blades 14 often vary as the propeller blades 14 rotate about the propeller axis 22, for example, when flow incident to the propeller blade 14 is non-parallel to the propeller axis 22. To mitigate the effects of these forces, the yoke 40 is permitted to rotate about the yoke center 62 as shown by arrows 42. This freedom of rotation allows forces acting on the propeller blades 14 to change the pitch of the propeller blades 14 cyclically as the propeller blades 14 move around the propeller axis 22 being influenced cyclically by the variation in in-flow to the propeller 10. For example, as a first propeller blade 14 is subjected to greater forces than a second propeller blade 14, the forces drive a change in pitch in the first rotor blade 14. This, in turn, causes rotation of the yoke 40 about the yoke center 62 which changes the pitch of the second propeller blade 14 by an equal and opposite amount. That is, in one embodiment, rotation of the yoke 40 about the yoke tilt axis 62 results in rotation of a first propeller blade 14 of the plurality of propeller blades 14 in a first direction and a rotation of a second propeller blade (14) of the plurality of propeller blades (14) in a second direction. In one embodiment, the first direction is substantially opposite to the second direction. As the propeller blades 14 rotate about the propeller axis 22, the forces acting on the first propeller blade 14 change, and through the use of the spherical portion 28, so does the pitch of the first and second propeller blades 14. The spherical portion 28 effectively reduces the cyclical forces acting on the propeller blades 14 and reduces the moments on the propeller shaft 18, airframe, and other components due to the cyclical loading of the propeller blades 14.

In some embodiments, as shown in FIG. 6, the propeller assembly 10 includes a yoke stop 64. The yoke stop 64 is a tubular piece located around the actuation shaft 24 at a shaft opening 66 in the hub 12 and is slidable therein. The yoke stop 64, when engaged, disables articulation of the yoke 40 about the spherical portion 28 of actuation shaft 24 thus stopping the cyclical pitch change in conditions when it is not desired, for example, low power approach and/or reversing conditions. The yoke stop 64 is engaged by increasing $P_f$ which forces the yoke stop 64 along the propeller axis 22 toward the yoke 40. The yoke stop 64 includes an engagement feature, in this embodiment, a stop ramp 68, which is engageable with a complimentary feature of the yoke 40, for example a yoke ramp 70. When the yoke stop 64 is moved toward the yoke 40 by the increase in $P_f$, the stop ramp 68 engages with the yoke ramp 70 to prevent rotation of the yoke 40 about the yoke center 62. In some embodiments the yoke stop 64 is engaged only at low blade angles typically associated with low power and reverse because it is travel is limited by stop surface 72. To disengage the yoke stop 64, $P_f$ is reduced to allowed movement of the yoke stop 64 away from the yoke 40. In some embodiments a return spring (not shown) may be used to assist in disengaging the yoke stop.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A blade pitch control mechanism for a propeller assembly (10) comprising:
    an actuation shaft (24) including a spherical member (28) disposed at a propeller axis (22); and
    a yoke (40) disposed around the spherical member (28) and rotatable thereon about a yoke tilt axis (62) substantially perpendicular to the propeller axis (22), the yoke (40) including a plurality of propeller blade attachments (44) each receptive of a propeller blade (14), the plurality of blade attachments (44) configured such that rotation of the yoke (40) about the yoke tilt axis (62) results in rotation of each propeller blade (14) about a blade pitch change axis (48); and a piston (26) in operable communication with the spherical member (28) capable of translating the spherical member (28) along the propeller axis (22).

2. The blade pitch control mechanism of claim 1 wherein rotation of the yoke (40) about the yoke tilt axis (62) results in rotation of a first propeller blade (14) of the plurality of propeller blades (14) in a first direction and a rotation of a second propeller blade (14) of the plurality of propeller blades (14) in a second direction.

3. The blade pitch control mechanism of claim 2 wherein the first direction is substantially opposite to the second direction.

4. The blade pitch control mechanism of claim 1 wherein the piston (26) is hydraulically activated.

5. The blade pitch mechanism of claim 1 including a yoke stop (64) to prevent rotation of the yoke (40) about the yoke tilt axis (62) when desired.

6. The blade pitch mechanism of claim 5 wherein the yoke stop (64) is a mechanical stop.

7. The blade pitch mechanism of claim 5 wherein the yoke stop (64) is hydraulically activated.

8. A propeller assembly (10) comprising:

a propeller shaft (18) extending along a propeller axis (22);

a plurality of propeller blades (14) in operable communication with the propeller shaft (18); and a blade pitch control mechanism including:

an actuation shaft (24) including a spherical member (28) disposed at the propeller axis (22);

a yoke (40) disposed around the spherical member (28) and rotatable thereon about a yoke tilt axis (62) substantially perpendicular to the propeller axis (22), the yoke (40) including a plurality of blade attachments (44) each receptive of a propeller blade (14) of the plurality of propeller blades (14), the plurality of blade attachments (44) configured such that rotation of the yoke (40) on the spherical member (28) about the yoke tilt axis (62) results in rotation of each propeller blade (14) about a blade pitch change axis (48); and a piston (26) in operable communication with the spherical member (28) capable of translating the spherical member (28) along the propeller axis (22).

9. The propeller assembly (10) of claim 8 wherein rotation of the yoke (40) on the spherical member (28) about the yoke tilt axis (62) results in rotation of a first propeller blade (14) of the plurality of propeller blades (14) in a first direction and a rotation of a second propeller blade (14) of the plurality of propeller blades (14) in a second direction.

10. The propeller assembly (10) of claim 9 wherein the first direction is substantially opposite to the second direction.

11. The propeller assembly (10) of claim 8 wherein the piston (26) is hydraulically activated.

12. The propeller assembly (10) of claim 8 including a yoke stop (64) to prevent rotation of the yoke (28) about the yoke tilt axis (62) when desired.

13. The propeller assembly (10) of claim 12 wherein the yoke stop (64) is hydraulically activated.

14. A method of cyclic pitch change of a plurality of propeller blades (14) of a propeller assembly (10) comprising:

rotating a first propeller blade (14) of the plurality of propeller blades (14) about a blade pitch change axis (48) in response to a flow force encountered by the first propeller blade (14);

translating rotation of the first propeller blade (14) into rotation of a yoke (40) about a yoke tilt axis (62) substantially perpendicular to a propeller axis (22) of the propeller assembly (10);

rotating a second propeller blade (14), disposed substantially opposite the first propeller blade (14), about the blade pitch change axis (48) in response to rotation of the yoke (40) about the yoke tilt axis (62); and translating a spherical member (28) along the propeller axis (22) via activation of a piston (26) disposed along the propeller axis (22).

15. The method of claim 14 wherein rotation of the first propeller blade (14) is in a first direction and rotation of the second propeller blade (14) is in a second direction substantially opposite the first direction.

16. The method of claim 15 wherein the yoke (40) rotates about the yoke tilt axis (62) on the spherical member (28) disposed at the propeller axis (22).

17. The method of claim 14 including preventing rotation of the yoke (40) about the yoke tilt axis (62) when desired via engagement of a yoke stop (64).

* * * * *